US010187116B2

(12) United States Patent
Vallespin

(10) Patent No.: US 10,187,116 B2
(45) Date of Patent: Jan. 22, 2019

(54) CIRCUIT AND METHOD FOR ACTIVATING AN NFC DEVICE

(71) Applicant: STMicroelectronics (Rousset) SAS, Rousset (FR)

(72) Inventor: Nathalie Vallespin, Fuveau (FR)

(73) Assignee: STMICROELECTRONICS (ROUSSET) SAS, Rousset (FR)

( * ) Notice: Subject to any disclaimer, the term of this patent is extended or adjusted under 35 U.S.C. 154(b) by 0 days.

(21) Appl. No.: 15/702,105

(22) Filed: Sep. 12, 2017

(65) Prior Publication Data

US 2018/0234132 A1    Aug. 16, 2018

(30) Foreign Application Priority Data

Feb. 14, 2017    (FR) ..................... 17 51184

(51) Int. Cl.
  *H04B 5/00*    (2006.01)
  *G06K 7/10*    (2006.01)
  *G06K 19/07*    (2006.01)
  *H04L 12/933*   (2013.01)

(52) U.S. Cl.
  CPC ....... *H04B 5/0012* (2013.01); *G06K 7/10237* (2013.01); *G06K 19/0703* (2013.01); *G06K 19/0705* (2013.01); *H04B 5/0037* (2013.01); *H04L 49/15* (2013.01)

(58) Field of Classification Search
  CPC ..................................................... H04W 4/80
  See application file for complete search history.

(56) References Cited

U.S. PATENT DOCUMENTS

| 8,345,401 B2* | 1/2013 | Fujita | G06K 19/0701 361/119 |
| 8,559,890 B2* | 10/2013 | Merlin | G06K 19/07749 455/41.1 |
| 8,816,469 B2* | 8/2014 | Kamata | G06K 19/0701 257/491 |
| 9,070,059 B2* | 6/2015 | Caruana | G06K 19/0701 |
| 2007/0018832 A1* | 1/2007 | Beigel | G06K 19/07345 340/572.7 |
| 2009/0011706 A1* | 1/2009 | Wilson | H04B 5/02 455/41.1 |
| 2009/0153236 A1 | 6/2009 | Kneepkens et al. | |
| 2010/0079921 A1* | 4/2010 | Fujita | G06K 19/0701 361/56 |
| 2010/0321164 A1* | 12/2010 | Wuidart | G06K 7/10158 340/10.4 |
| 2012/0028575 A1* | 2/2012 | Chen | G06K 19/0705 455/41.1 |
| 2013/0225076 A1* | 8/2013 | Rizzo | H04B 5/0037 455/41.1 |

(Continued)

FOREIGN PATENT DOCUMENTS

EP    1126407 A2    8/2001
EP    2088540 A1    8/2009

*Primary Examiner* — Wen W Huang

(74) *Attorney, Agent, or Firm* — Slater Matsil, LLP

(57) ABSTRACT

An embodiment near-field communication (NFC) router, includes a first switch coupled between a first terminal of the NFC router and a second terminal of the NFC router; and a rectifier bridge having an output terminal coupled to a control terminal of the first switch, the rectifier bridge being configured to rectify a signal detected by an antenna external to the NFC router.

18 Claims, 2 Drawing Sheets

(56) References Cited

U.S. PATENT DOCUMENTS

| | | | | |
|---|---|---|---|---|
| 2013/0337744 A1* | 12/2013 | Lefley | .................. | H04B 5/00 |
| | | | | 455/41.1 |
| 2014/0035521 A1* | 2/2014 | Endo | .................. | H02J 5/005 |
| | | | | 320/108 |
| 2014/0273832 A1* | 9/2014 | Kim | .................. | H02J 5/005 |
| | | | | 455/41.1 |
| 2015/0154486 A1* | 6/2015 | McFarthing | ....... | G06K 19/0712 |
| | | | | 235/492 |
| 2018/0025265 A1* | 1/2018 | Li | .................. | G06K 19/0723 |
| | | | | 235/492 |

* cited by examiner

CIRCUIT AND METHOD FOR ACTIVATING AN NFC DEVICE

CROSS-REFERENCE TO RELATED APPLICATIONS

This application claims priority to French Patent Application No. 1751184, filed on Feb. 14, 2017, which application is hereby incorporated herein by reference.

TECHNICAL FIELD

The present description generally relates to electronic circuits and mobile communication equipment and, in particular embodiments, a circuit and a method for activating a near-field communication (NFC) device.

BACKGROUND

Many devices are now provided with near-field communication functions. The most widespread are mobile telecommunication devices (e.g., mobile phones or smartphones) which are increasingly often provided with a near-field communication interface, generally referred to as an NFC router, conferring additional functionalities on the phone. NFC routers enable a mobile device to operate either in card mode, the device then having the functions of a contactless communication card, or in reader mode, the device then having the functions of a contactless card reading and/or writing terminal.

Whether in card mode or in reader mode, the NFC router is powered by the battery of the device that contains the router. The battery of the device itself is generally charged by being connected, via a charger, to, e.g., the electrical distribution network, dynamo, solar panel, etc.

SUMMARY

Embodiments of the invention remedy all or part of the drawbacks of the devices combining battery and near-field communication interface.

Embodiments of the invention improve the energy management of such a device.

Embodiments of the invention provide a solution particularly suited to devices operating only in card mode or in peer-to-peer card mode.

An embodiment provides a near-field communication router includes a first switch internal to the router and between a first terminal of the router and a second terminal of the router. A control terminal of the first switch is linked to an output terminal of a rectifier bridge for rectifying a signal picked up by an antenna external to the router.

According to an embodiment, the control terminal of the first switch is linked to the output terminal of the rectifier bridge by a resistive and capacitive cell.

According to an embodiment, the cell includes a resistive element connecting the output terminal of the rectifier bridge to the control terminal of the first switch and a capacitive element connecting the control terminal of the first switch to the second terminal of the router.

An embodiment provides a system for activating a near-field communication router includes a first switch internal to the router and between a first terminal of the router and a second terminal of the router. A control terminal of the first switch is linked to an output terminal of a rectifier bridge for rectifying a signal picked up by an antenna. A second switch is external to the router and located between a first terminal for applying a voltage supplied by a battery and a third terminal of the router. A control terminal of the second switch is connected to the first terminal of the router.

According an embodiment, the first terminal of the router is linked, by a resistive element external to the router, to the first terminal for applying a voltage supplied by a battery.

According to an embodiment, the third terminal of the router is connected to the earth.

An embodiment provides a portable communication device including a router as described.

An embodiment provides a portable communication device including a system as described.

An embodiment provides a method for activating a contactless communication router. The presence of a voltage is detected at the terminals of a rectifier bridge for rectifying a signal picked up by an antenna while no voltage is applied between the power supply terminals of the router. A power supply voltage is applied between the terminals.

BRIEF DESCRIPTION OF THE DRAWINGS

These features and advantages, as well as others, will be disclosed in detail in the following non-restrictive description of particular embodiments in relation to the accompanying figures in which.

DETAILED DESCRIPTION OF ILLUSTRATIVE EMBODIMENTS

The same elements have been designated by the same references in the different figures.

For the sake of clarity, only the steps and elements useful to the understanding of the embodiments that will be described have been represented and will be given in detail. In particular, the operation of a near-field communication router has not been given in detail, the embodiments described being compatible with common operation. In addition, the applications of a device or system incorporating such a router have also not been given in detail, the embodiments described being, once again, compatible with common applications.

Unless specified otherwise, when reference is made to two interconnected elements, this means directly connected without any intermediate element other than conductors, and when reference is made to two interlinked elements, this means that these two elements may be directly linked (connected) or linked via one or more other elements.

In the description that follows, when reference is made to the terms approximately, about and in the order of, this means within 10%, preferably within 5%.

Figure 1:
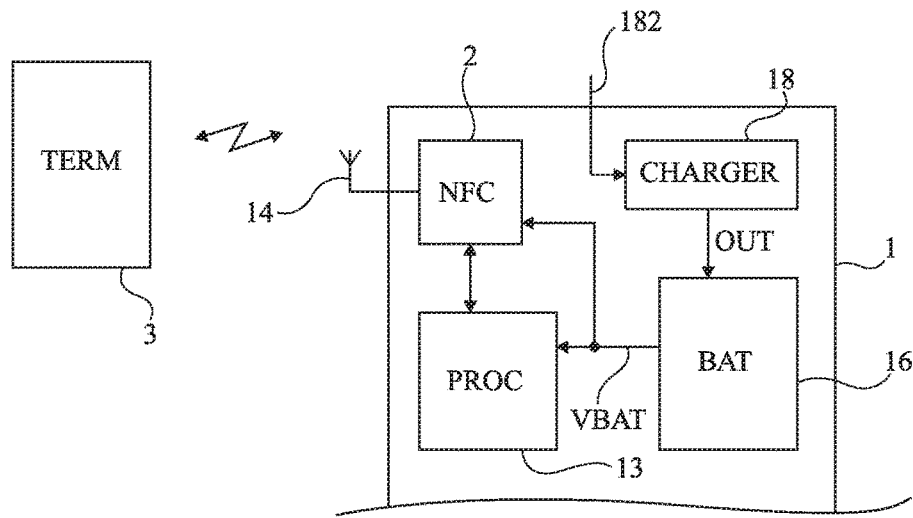
FIG. 1 is a partial, schematic block diagram of an example of an electronic device of the type to which the embodiments that will be described apply.

FIG. 1 is a schematic representation in the form of blocks of a near-field communication system partially illustrating an embodiment of a mobile device 1 provided with a battery and a near-field communication circuit.

In some embodiments, the present description applies more particularly to devices including a near-field communication circuit and a rechargeable battery.

The device 1 includes, inter alia, a near-field communication interface 2 (also referred to herein as NFC router 2) connected to an antenna 14 for communicating with a terminal 3 when the device 1 is a short distance from the terminal 3. The device 1 further includes a battery 16 for operating this device regardless of the near-field communication mode. For example, in the case of a mobile phone, the battery 16 makes it possible to operate the phone for a GSM-type telecommunication. The battery 16 is charged by a charger 18 provided in the device 1 and generally receiving a DC voltage from a terminal 182 intended to be connected to an external transformer. The battery 16 also powers the NFC router 2, whether in reader mode, in card mode, or in peer-to-peer mode.

The device 1 further includes various processing circuits according to its nature. These circuits have been symbolized in FIG. 1 by a processor 13. These circuits are capable of being powered by the battery 16 and, at least for some of them, communicating with the NFC router 2.

The battery charger 18 is generally a voltage regulation system for providing the battery 16 with a suitable charge voltage and monitoring the battery charge.

In a "peer-to-peer" or P2P operating mode, two devices provided with NFC routers 2 communicate with each other for exchanging information. In such an operating mode, each device operates alternately in card mode and in reader mode.

When an NFC device (notably a portable device) operates in reader or terminal mode, its battery powers the NFC router 2 and the processing circuits 13.

However, in periods of standby or non-operation of the NFC router, it is placed in a low consumption mode.

A common solution for avoiding power consumption by the router 2 even in standby mode, is that the NFC router 2 is not powered during standby periods and that the user activates a switch (e.g., the standby switch) to switch it back on. However, this requires an intervention by the user.

Another solution would be to leave the circuits of the NFC router 2 active (powered). However, this is incompatible with the desire for minimum power consumption in standby mode.

Figure 2:
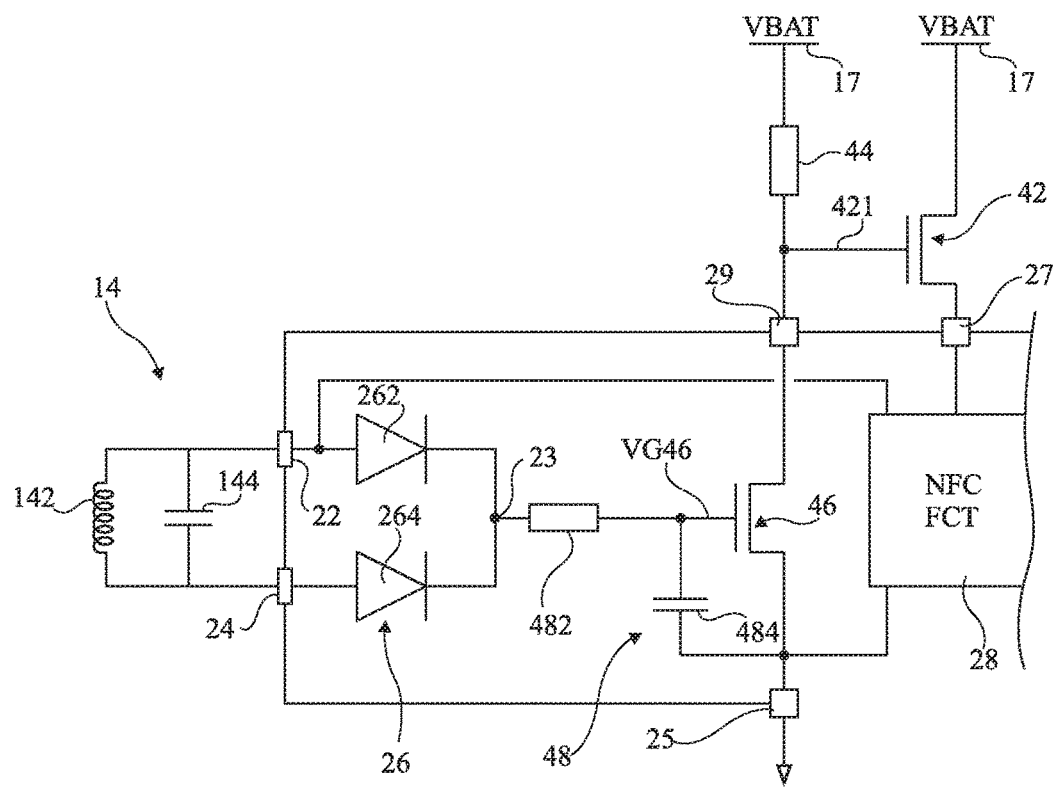
FIG. 2 is a simplified, partial diagram of an embodiment of an NFC router.

FIG. 2 is a simplified, partial diagram of an embodiment of an NFC router 2.

This router 2 includes two terminals 22 and 24 to which the antenna circuit 14 is connected. This circuit 14 includes a parallel oscillating circuit formed of an inductive element 142 forming the antenna and a capacitive element 144 in parallel (or in series in other embodiments). In some cases, the capacitive element 144 is incorporated in the router 2. One or both terminals 22 and 24 are linked to the near-field circuits 28 and other circuits of the router 2 in order to convey the signals (received and transmitted) of the communication (the signals which contain the modulation carrying the information). These circuits 28 are generally the radio frequency encoding and decoding circuits as well as the various NFC processing circuits.

The circuits 28 are intended to be powered by the battery 16. To do so, a terminal 27 of the router 2 is linked to a terminal 17 linked to the battery 16, more precisely to the positive terminal of the battery, supplying a potential VBAT.

According to the embodiment represented, the two terminals 22 and 24 are linked to the respective anodes of two rectifying elements (preferably two diodes 262 and 264) mounted in a bridge 26, the cathodes of which are interconnected (e.g., form a node) at a terminal 23.

Today, either the battery continuously powers at least a standby mode of the circuits 28, which then includes, where appropriate, elements for detecting the presence of a field picked up by the antenna 14 in order to wake up the other elements, or a switch triggered by an action of the user is provided between the battery 16 and the terminal 27. In the first case, there is pointless residual consumption. In the second case, operation is impractical and activation takes time.

According to the embodiment represented in FIG. 2, a switch 42, e.g., a p-channel MOS transistor, is inserted between the terminals 17 and 27. This switch 42 is therefore external to the router 2. The control terminal 421 (e.g., gate) of the switch 42 is linked to a terminal 29 of the router 2. The terminal 29 is linked to the terminal 17 via a resistive element 44. Inside the router 2, the terminal 29 is linked, by a switch 46, e.g., an n-channel MOS transistor, to the earth) or ground) connection terminal 25. The control terminal (e.g., gate) of the transistor 46 is linked by a resistive and capacitive cell 48, including a low-pass filter, to the output 23 of the rectifier bridge. The cell 48 includes a resistive element 482 connecting the terminal 23 to the gate of the transistor 46 and a capacitive element 484 linking the gate of the transistor 46 to the terminal 25 (the earth). The time constant of the cell 48 is selected according to the operating frequency of the NFC antenna 14, typically 13.56 MHz in order to smooth the signal rectified by the bridge 26 and control the transistor 46.

The role of the transistor 46 is to cause the closure of the transistor 42 when a radio frequency radiation in the NFC range of frequencies is picked up by the antenna 14.

The transistors 42 and 46, with the resistive element 44 and the filter 48, constitute a trigger circuit for triggering the power supply of the router 2 by the battery 16.

Other embodiments of this trigger circuit using passive components, except for the switch 46, are conceivable. Indeed, other passive circuits for detecting the field at the terminals of the antenna may be provided which are capable of activating the transistor 46.

Figure 3:
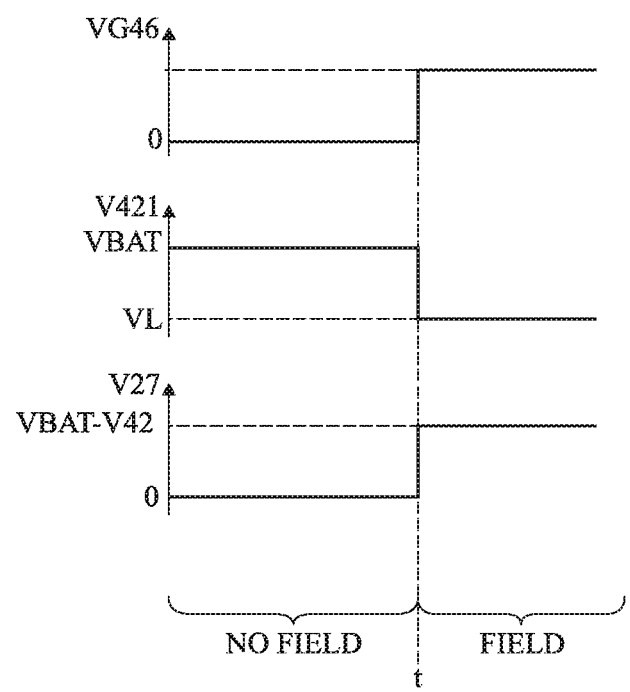
FIG. 3 schematically illustrates the trigger circuit operation for triggering the power supply of an NFC router.

FIG. 3 very schematically illustrates the trigger circuit's operation. This figure represents simplified examples of progressions of the gate voltage VG46 of the transistor 46, the gate voltage V421 of the transistor 42 and the voltage V27 of the terminal 27.

For simplifying the representation of the figures, parasitic voltage drops are not taken into account and the voltage levels are symbolized by levels 0 and 1.

In the absence of any radio frequency field (indicated as NO FIELD in FIG. 3) picked up by the antenna 14, the gate of the transistor is not polarized (voltage VG46 at zero) and the transistor 46 is blocked. Consequently, the gate of the transistor 42 is in a high state (voltage VG421 at the level VBAT) and the transistor 42 is also blocked. The terminal 27 is not powered (level zero).

In this operating mode, the router 2 is not powered. The only consumption of the router 2 comes from the losses in the transistor 46 in the blocked state and is therefore minimized.

In the presence of a field (indicated as FIELD in FIG. 3) picked up by the antenna 14, the gate signal VG46 of the transistor 46 switches to the high state. The level depends on the voltage recovered at the terminals of the resonant circuit of the antenna 14. The switching of the transistor 46 takes place (time t) as soon as this rectified and filtered level reaches the threshold voltage of the transistor 46. The conduction of the transistor 46 causes the drop in the gate voltage V421 of the transistor 42. The low level VL of the voltage V421 corresponds to VBAT*(R44+R46)/(R44*R46), where R44 represents the value of the resistive element 44 and R46 the drain-source resistance of the transistor 46 in the "on" state. The low level VL is below the threshold voltage Vth42 of the transistor 42, which causes its closure or conduction. This causes the powering of the router 2 from the terminal 27 which receives the voltage VBAT reduced by the drain-source voltage in the "on" state V42 of the transistor 42.

In this operating mode, the consumption of the router 2 is increased by dissipation in the drain-source resistances in the "on" state of the transistors 42 and 46. However, this is in an out-of-standby mode in which such consumption is acceptable.

One advantage of the embodiments described is that the consumption of the router in standby mode is minimized while allowing an automatic exit from the standby mode in the presence of an NFC field.

One advantage of the embodiments described is that they are compatible with a deactivation of the router by the current solutions, e.g., by the processor of the phone for deactivating the function. For example, the terminal 17 is then linked to the battery (or to a power supply rail from the battery) by a switch controlled by the processor.

According to another example, provision is made to connect the terminal 29 to an output terminal of the processor for forcing a drop in the potential of the gate of the transistor 42 when it is wanted to trigger the power supply of the router 2 regardless of the presence of a field.

Another advantage of the embodiments described is the small number of added components (two external to the router, three internal to the router).

Various embodiments have been described, various variants and modifications will be apparent to the person skilled in the art. In particular, the practical implementation of the embodiments and the dimensioning of the components (resistors 44 and 482, capacitor 484 and transistors 42 and 46) is within the grasp of the person skilled in the art from the functional description given above.

What is claimed is:

1. A near-field communication (NFC) router, comprising:
   a first terminal;
   a second terminal;
   a first switch coupled between the first terminal of the NFC router and the second terminal of the NFC router;
   a rectifier bridge having input terminals coupled to terminals of an antenna external to the NFC router, the rectifier bridge being configured to rectify a signal detected by the antenna external to the NFC router;
   a resistive and capacitive cell comprising a resistive element having a first terminal and a second terminal, the first terminal of the resistive element being coupled to form a node with an output terminal of the rectifier bridge, the second terminal of the resistive element being coupled to form a node with a control terminal of the first switch; and
   a third terminal configured to be coupled to a voltage source through a second switch that is external to the NFC router, wherein the first switch comprises a first transistor of a first conductivity type, wherein the second switch comprises a second transistor of a second conductivity type different from the first conductivity type.

2. The NFC router according to claim 1, wherein the resistive and capacitive cell further comprises:
   a capacitive element connecting the control terminal of the first switch to the second terminal of the NFC router.

3. The NFC router according to claim 1, further comprising communications circuitry coupled to the third terminal, the communications circuitry being configured to be powered by the voltage source via the third terminal.

4. The NFC router according to claim 1, wherein the third terminal is configured to be coupled to the voltage source through a current path of the second transistor, and wherein the first terminal of the NFC router is configured to be coupled to a control terminal of the second transistor.

5. The NFC router according to claim 1, wherein the second terminal of the NFC router is configured to be coupled to a ground potential.

6. The NFC router according to claim 1, wherein the rectifier bridge comprises:
   a first diode having an anode coupled to a fourth terminal of the NFC router, and a cathode coupled to the output terminal of the rectifier bridge; and
   a second diode having an anode coupled to a fifth terminal of the NFC router, and a cathode coupled to the output terminal of the rectifier bridge.

7. A system, comprising:
   a near-field communication (NFC) router, comprising:
      a first terminal configured to be coupled to a voltage supplied by a battery;
      a second terminal configured to be coupled to a ground potential;
      a third terminal configured to be coupled to the voltage supplied by the battery;
      a rectifying circuit configured to rectify a signal detected by an antenna;
      a first switch coupled between the first terminal and the second terminal; and
      a first resistive element having a first terminal and a second terminal the first terminal of the first resistive element being coupled to form a node with an output terminal of the rectifying circuit, the second terminal of the first resistive element being coupled to form a node with a control terminal of the first switch; and
   a second switch external to the NFC router and coupled between the voltage supplied by the battery and the third terminal of the NFC router, wherein a control terminal of the second switch is connected to the first terminal of the NFC router.

8. The system according claim 7, wherein the first terminal of the NFC router is coupled by a resistive element, external to the NFC router, to the voltage supplied by the battery.

9. The system according to claim 7, wherein the rectifying circuit comprises:
   a first diode having an anode coupled to a fourth terminal of the NFC router, and a cathode coupled to the output terminal of the rectifying circuit; and
   a second diode having an anode coupled to a fifth terminal of the NFC router, and a cathode coupled to the output terminal of the rectifying circuit.

10. The system according to claim 9, further comprising the antenna having terminals coupled to the fourth terminal of the NFC router and the fifth terminal of the NFC router.

11. The system according to claim 9, wherein the first switch and the second switch comprise transistors of opposite conductivity types.

12. The system according to claim 9, wherein the NFC router further comprises a capacitive element coupled between the control terminal of the first switch and the second terminal of the NFC router.

13. The system according to claim 9, further comprising a second resistive element coupled between the first terminal and the voltage supplied by the battery.

14. The system according to claim 9, wherein the system comprises a portable communication device.

15. A method for activating a contactless communication router, the method comprising:
- decoupling a first terminal of the contactless communication router from a second terminal of the contactless communication router in response to no signal being detected by an antenna, the first terminal of the contactless communication router being controllably coupled to a ground potential, the second terminal of the contactless communication router being tied to the ground potential;
- decoupling a third terminal of the contactless communication router from a power supply voltage in response to no signal being detected by the antenna, the third terminal being configured to supply the power supply voltage to communication circuitry of the contactless communication router;
- coupling the first terminal of the contactless communication router to the ground potential in response to a signal being detected by the antenna; and
- coupling the third terminal of the contactless communication router to the power supply voltage in response to the coupling of the first terminal of the contactless communication router to the ground potential, wherein the contactless communication router comprises a rectifier bridge, a resistive element, and a first switch, the first switch being coupled between the first terminal and the second terminal of the contactless communication router, the rectifier bridge being coupled between the antenna and a first terminal of a resistive element, the second terminal of the resistive element being coupled to form a node with a control terminal of the first switch.

16. The method according to claim 15, wherein coupling the first terminal of the contactless communication router to the ground potential in response to the signal being detected by the antenna comprises:
- generating, by the rectifier bridge, a control signal in response to the signal being detected by the antenna; and
- triggering the first switch from an open state to a closed state using the control signal.

17. The method according to claim 16, wherein the third terminal of the contactless communication router is controllably coupled to the power supply voltage by a second switch, and wherein coupling the third terminal of the contactless communication router to the power supply voltage in response to the coupling of the first terminal of the contactless communication router to the ground potential comprises:
- triggering the second switch from an open state to a closed state in response to the first terminal of the contactless communication router being coupled to the ground potential.

18. The method according to claim 17, wherein a control terminal of the second switch is coupled to the first terminal.

* * * * *